United States Patent Office 2,830,945
Patented Apr. 15, 1958

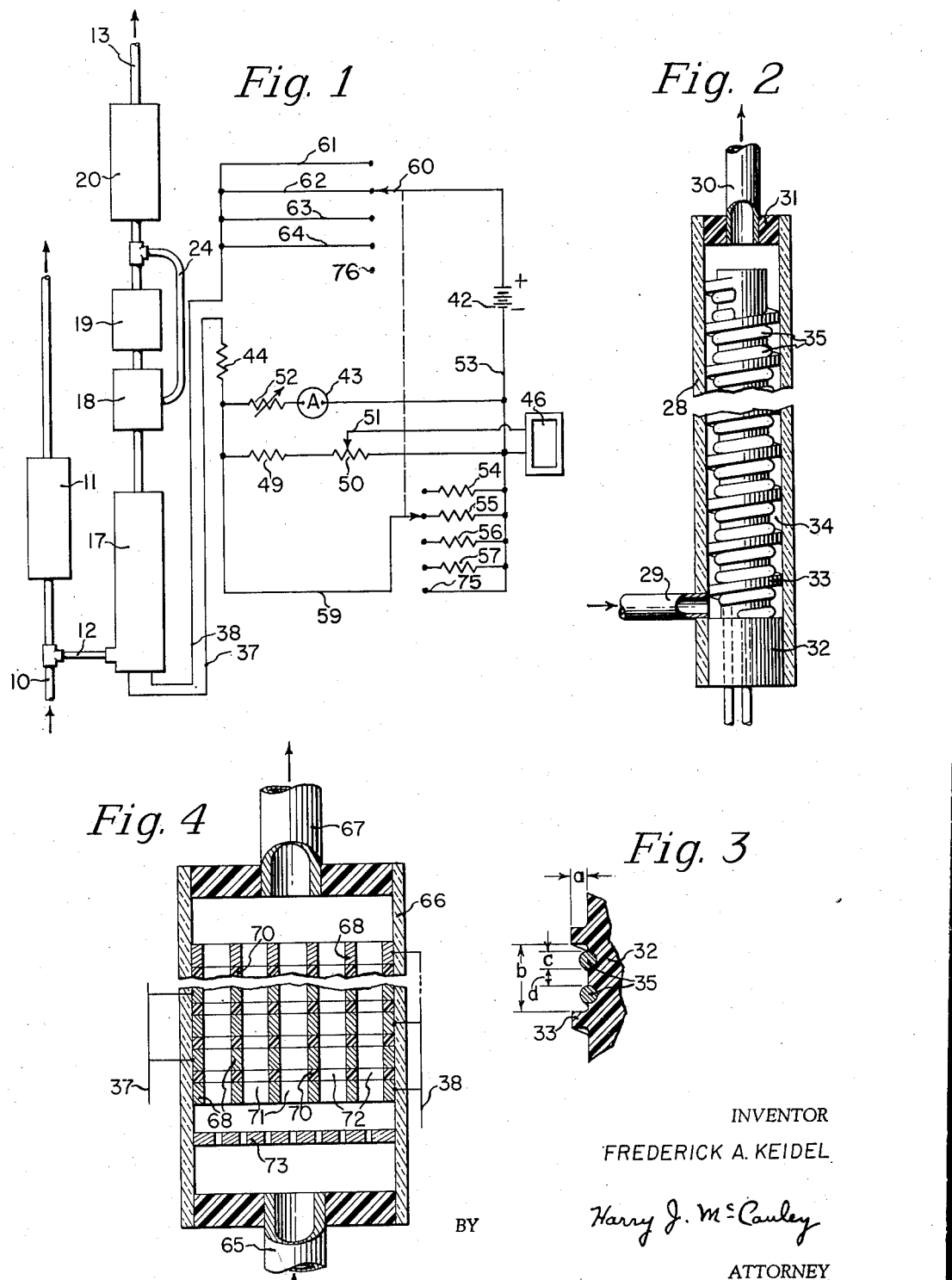

2,830,945

APPARATUS FOR WATER DETERMINATION

Frederick A. Keidel, Wilmington, Del., assignor to E. I. du Pont de Nemours and Company, Wilmington, Del., a corporation of Delaware Application May 3, 1955, Serial No. 505,599

5 Claims. (Cl. 204—195)

This invention relates to a method and apparatus for the determination of water in fluids, and particularly to an electrolytic method and apparatus for the measurement of water in concentrations as low as a fractional part per million or in greater concentrations in gases or liquids.

In chemical manufacture it is oftentimes desirable to determine the water content of flowing fluid streams with a very high degree of accuracy and continuously, so that appropriate process control measures can be taken with a minimum of delay. Many devices have been contrived for the measurement of water in fluid streams, perhaps the most common being those depending on absorption or electrical conductivity for their operation. These are objectionable for a variety of reasons, in that those which are gravimetric in principle require excessive time to effect measurement, while others, such as the electrical conductivity types, are extremely sensitive to the temperature of the surroundings, are influenced by inequalities and changes in film thickness and are inordinately affected by the presence of ionizable impurities which may occur in varying amounts in the fluids under examination.

An object of this invention is to provide an improved method and apparatus for the determination of water in either vapor or liquid phase in fluids. Another object of this invention is to provide a method and apparatus of high sensitivity and stability for the measurement of water in flowing fluids. The manner in which these and other objects of this invention are attained will become apparent from the detailed description and the following drawings, in which:

Fig. 1 is a schematic representation of a preferred arrangement of apparatus for the practice of this invention showing details of connection with a fluid process line and one type of electrical circuit for use in conjunction with the water analysis cell, Fig. 2 is a longitudinal cross-sectional view of a water analysis cell particularly adapted to the measurement of water in a gas, which can be used with the apparatus of Fig. 1, Fig. 3 is a fragmentary longitudinal section taken across two successive lands of the water analysis cell of Fig. 2, and Fig. 4 is a longitudinal cross-sectional view of a preferred embodiment of water analysis cell according to this invention which is particularly adapted to the measurement of water in a liquid and which can be used with the auxiliary apparatus of Fig. 1.

Generally, the method of water determination according to this invention comprises contacting the wet fluid under examination with an amount of a hygroscopic substance which is electrically conductive when wet to thereby absorb substantially all of the water from the fluid, subjecting the water absorbed in the hygroscopic substance to complete quantitative electrolysis and determining the water content of the fluid as a function of the electrical current used in the electrolysis. Water analysis apparatuses are provided which are particularly applicable to the determination of water in gaseous fluids on the one hand and to the determination of water in liquids on the other.

Water determinations according to this invention may be conducted on either gases or liquids by the use of the apparatus of Fig. 1, it being preferred however to employ an analysis cell such as that shown in Figs. 2 and 3 for gases, while the cell of Fig. 4 is especially adapted for use with liquids, although either cell is operative regardless of fluid sample phase. The following description is particularly directed to the analysis of water in gases, it being understood, however, that my invention can be employed for the analysis of water in liquids with completely satisfactory results by the same technique. Also, anlaysis of flowing streams is described in detail, it being understood that analysis of static samples according to the invention is equally practicable and, obviously, is easier to accomplish.

In Fig. 1, the pipe 10 represents a plant process line through which the fluid which it is desired to analyze for water passes. Line 10 is provided with a rotameter 11, or like conventional device measuring the rate of flow of material through the line. A bypass pipe 12 is connected to pipe 10 to draw off a continuous representative stream of sample fluid for analysis and discharge in the dry state through line 13 discharging to waste or to a suitable receiver, not shown, as desired. In communication with lines 12 and 13 are the elements consisting of water analysis cell 17, flow regulator 18, flow restrictor 19 and rotameter 20, all connected in series arrangement in the direction of sample flow in the order recited.

For reasons hereinafter explained in detail, it is desirable to maintain a preselected rate of sample flow and this is accomplished by sensing a control pressure downstream from flow restrictor 19, which may be a Foxboro adjustable restrictor model B102RP, through the loop connection indicated generally at 24. The pressure signal thereby derived is applied to the control diaphragm of regulator 18, which may be a Moore Products Co. model 63BD, which is adapted to maintain the pressure drop across restrictor 19 at a value preserving a preselected sample flow rate. Rotameter 20 is provided in the sample line to apprise the operator of the existing flow rate, thus enabling him to make appropriate adjustment in the setting of restrictor 19 whenever the range limits of this device are passed.

Referring to Figs. 2 and 3, a preferred embodiment of water analysis cell for use in determining the water content of gaseous fluids comprises circular glass conduit 28, which is provided with sample inlet connection 29 and sample outlet connection 30. These connections may be sealed to conduit 28 with a suitable cement or through polytetrafluoroethylene stoppers, such as that indicated at 31 in Fig. 2. Mounted within the conduit and coaxial therewith, is a cylindrical electrode support 32 fabricated from rigid electrical insulation, such as polytetrafluoroethylene or the like, which is machined over the full length above the base portion with a helical thread 33 adapted to abut tightly the inside periphery of conduit 28 and thereby define with it a helical gas-retaining space 34 of length sufficient to insure complete absorption removal of the water from the gas in analysis.

The electrolyzing electrodes 35, of which only a single pair is shown, although there obviously could be more pairs, if desired, are wound around support 32 in spaced relationship to, and out of contact with, one another, electrodes 35 being of course fabricated from an electrical conductor, preferably one of the noble metals, such as platinum as anodes, while stainless steel and other materials can be used as the cathodes with good results. The helical expanse of support 32 is preferably grooved as indicated in Fig. 3 to afford a retention surface for electrodes 35, which are wound on tightly to prevent their dislodgement during service and may even be attached to the underlying support by screws, cement or the like, not shown. The interspacing $d$ (Fig. 3) of the electrodes 35 of a pair is kept substantially constant throughout the full lengths of the electrodes to maintain an effective electrolysis of approximately constant width. The ends of the electrodes are led outside conduit 28 through drilled passages in the base of support 32 and are thus available for connection with leads 37 and 38 (Fig. 1) comprising part of the apparatus electrical circuit.

Numerous hydroscopic electrically conductive materials are available for use in conjunction with this invention, depending upon the nature of the fluid which it is desired to analyze for water, it being understood that the electrolytic properties of the hygroscopic material should be unaffected by the presence of all substances in the process stream, and, of course, that the material should be capable of removing water quantitatively from the fluid. Phosphoric acid has proved to be completely satisfactory for water analysis of the streams comprising one or more of the ingredients: air, ethylene and halogen-substituted hydrocarbons, such as the "Freons" and ethyl chloride, and is applied by merely brushing it on over the paired electrodes and the interspace therebetween. Since the more concentrated solutions of phosphoric acid are relatively viscous, and are thus somewhat more difficult to apply than dilute solutions of the order of 10% acid content, it is preferred to apply the acid in dilute mixture and then operate the apparatus without putting a fluid stream through it for a sufficient time to dry the acid thoroughly and thus bring it up to a hygroscopic level capable of absorption of water from a fluid stream to be evaluated, this condition being signalled by failure of the acid to further conduct the electric current. For an apparatus through which the gas sample flow rate, referred to standard conditions, is 100 cc./min. and which has the particular dimensions (refer Fig. 3) of $a=0.01''$, $b=0.0625''$, $c=0.007''$ and $d=0.005''$, and where the length of the helical gas retaining space was 30", this required about 30 hrs. of operation, after which all water originally in the hygroscopic acid was electrolyzed into its elemental gases. The acid was thus dehydrated to strongly hygroscopic form and, since in operation water absorbed in it is completely removed by electrolysis without any vitiation of the acid, it remains hydroscopic indefinitely.

Another example of a suitable hygroscopic substance which can be utilized according to this invention is potassium hydroxide, the use of which is convenient where acidic properties are objectionable but basic characteristics can be tolerated.

The electrical circuit for this invention can be extremely simple and may, in fact, consist merely of a D. C. power source 42, which may conveniently be a 45 volt radio "B" battery, in series connection with microammeter 43 across leads 37 and 38. However, for best results the inclusion of other circuit elements is preferred, among which may be a meter protection resistor 44 interposed between cell 17 and the meter, a recording meter 46 and range selector switches and associated resistors such as hereinafter described in greater detail.

Referring to Fig. 1, it will be seen that the recording meter and range selector switch circuits are parallel-connected with respect to ammeter 43. The circuit for meter 46 consists of a fixed resistor 49 in series with a tapped resistor 50, the tap 51 of which is connected to one terminal of meter 46, while the other end of resistor 50 is connected to the other meter terminal and also to the bus 53 completing circuit with battery 42. It will be understood that the voltage existing across the terminals of meter 46 is in direct proportion to the current through resistors 49 and 50 and thus to the absorbed water electrolyzed in analysis cell 17, whereupon meter 46 can be calibrated in terms of water content of the sample. It is desirable to provide means for bringing the range of recording meter 46 into correspondence with that of ammeter 43 and this is accomplished by tap 51, which permits the adjustment of full scale on meter 46 with full scale on ammeter 43. It is also preferred to maintain the resistance in the circuit branch including ammeter 43 constant, even when a new instrument is substituted for a particular ammeter, and this is accomplished by interposing a variable resistor 52 in circuit with 43.

The range selector switches of Fig. 1 are of conventional design and comprise individual resistors 54, 55, 56, and 57, each provided with a switch contact for engagement with a movable contactor 59 which is mechanically ganged with a second contactor 60, as indicated in broken line representation. Sub leads 61, 62, 63, and 64, each provided with a switch contact for engagement with contactor 60, complete the circuit from battery 42 to lead 38 running to water analysis cell 17. Off position contacts 75, adjacent resistors 54—57, and 76, adjacent sub leads 61—64, serve the function of a switch in conjunction with contactors 59 and 60. The electrical resistance of 54, 55, 56, and 57 are preselected to be in sequence of increasing magnitude, whereby, by successive adjustment of contactor 59, relatively more current is directed through ammeter 43 and a range selection function is achieved when the water content of the fluid in test lies within successively lower finite ranges.

It will be understood that a variety of different electrode arrangements are possible with the apparatus of this invention in that, if an electrically non-conductive conduit is employed, the electrode pairs can be supported on the inside periphery thereof, whereupon the function of the central plug will be solely that of defining, in conjunction with the conduit, a flow path for the fluid in analysis. In some instances it may be desirable to employ a metal conduit in place of a non conductor such as glass and this is perfectly feasible, providing the conduit is electrically insulated from any neighboring structures which might complete a circuit through hygroscopic material bridging the conduit-electrode interspace. Another arrangement which is particularly advantageous in certain circumstances is to employ a metal conduit for example retention, but include it in the electrical circuit as one electrode of a pair or pairs, the other electrode being supported on a central element in the same manner as hereinbefore described and the hygroscopic electrolyte in this case being brushed on so as to span the electrode-conduit interspace. Obviously, the foregoing electrode arrangements are merely representative of the many dispositions which can be employed and constitute examples of types which have special advantages in individual cases.

In operation, sample gas passes continuously through the helical passage 34 of water analysis cell 17 and the water therein is absorbed and electrolyzed to hydrogen and oxygen, which gaseous products remain in the sample stream and are discharged with dried sample through line 13. The amount of water in the gas is a function of the electrical current expended during the electrolysis and this current is indicated by microammeter 43. At the same time, a recorded value of water content is obtained by recorder 46. It should be mentioned that electrical current consumption in the electrolysis of the water removed from the sample furnishes a particularly accurate indication of water content, since precise coulometric equivalents of electrical energy are expended for given weights of water in accordance with Faraday's law. When the sample flow rate is 100 cc./min. at 25° C. and 760 mm. of pressure, the observed current indicated by micrommeter 43 is exactly 13.2 times the number of parts per million of water present, a relationship affording ready conversion of electrical readings to p. p. m. water contents.

Extensive tests of water determination in the range of several p. p. m. to 2000 p. p. m. with apparatus constructed according to this invention have revealed that the electrolytic evaluation of water can be conducted relatively rapidly and without objectionable time delay in response. In this connection, medium thickness hygroscopic material films give an analytical response within a time interval of about one minute. From this it will be understood that some time is, of course, consumed in the electrolysis and, where there is a rapidyy fluctuating and extensive variation in water content, the apparatus meters will indicate an average water content which will depend on sample water variation with time. Ordinarily, such extensive and rapid fluctuations in water content are not normally encountered in industrial operations and signal such a departure from accepted norms that fundamental corrections of process conditions are thereby indicated, and thus do not detract from the utility of this invention.

The embodiment of apparatus shown in Fig. 4 is particularly adapted to the measurement of water in liquids and comprises a multiplicity of metal electrode discs 68, which are separated one from another by insulating discs 70, successive electrode discs being connected to the opposite leads 37 and 38 running to the power source 42 in the same manner as shown in Fig. 1. Both the electrode discs and the insulating discs are provided with longitudinally disposed open passages 71 and 72, respectively, and the stacked discs are arranged within sample-retaining conduit 66 with all passages in alignment. The hygroscopic electrolyte is brushed over the full lengths of these passages and the construction of the cell is such as to minimize the sweeping action of the sample liquid through the passages, so that the sample flow does not strip away objectionable quantities of the water absorbed during operation. If desired, a perforated liquid distribution plate 73 may be incorporated between the electrode stack and the sample inlet to effect balanced sample distribution to the various parts of the stack.

Electrodes 68 and discs 70 can be retained within conduit 66 by frictional engagement therewith, or by supporting rings or other means of attachment not shown, and the cell is provided with sample inlet and outlet connections 65 and 67, respectively. The water analysis cell of Fig. 4 can be substituted as a unit for cell 17 shown in Fig. 1 by making the piping connections to the inlet and outlet of the cell, operation being exactly the same as that hereinbefore described for gas sample analysis.

Instruments constructed according to this invention possess important advantages over devices of the prior art, in that they are completely quantitative over wide ranges of water concentration, and therefore there is no need for frequent calibrations or standard samples, they are quite selective to water, so that very few materials cause interference, and temperature variations have no effect on operation. In addition, the instruments are low in first cost, require only negligible maintenance and may be made in very small sizes.

It will be understood that the effluent from the electrolysis is free of water and it is therefore possible to employ electrolysis specifically for drying, all as taught in my copending application S. N. 505,598 of even date, now Patent No. 2,816,067. Also, it is possible to prepare predetermined amounts of elemental substances by electrolysis, as taught in my copending application S. N. 505,597, filed contemporaneously herewith.

From the foregoing it will be understood that this invention may be modified in many respects without departure from the essential spirit, wherefore it is intended to be limited only by the scope of the following claims.

What is claimed is:

1. An apparatus for the determination of the water content of a fluid comprising in combination a closed conduit defining a fluid-retaining space, fluid inlet and outlet openings in said conduit, at least one pair of electrically isolated electrodes disposed in close proximity to each other within said fluid-retaining space, a hygroscopic substance which is electrically conductive only when wet in contact with both said electrodes in amount sufficient to absorb substantially all of the water in fluid passed into said conduit, a direct current power source of voltage sufficient to electrolyze absorbed moisture in said hygroscopic substance connected across said electrodes, and current measuring means connected in circuit with said power source and said electrodes for measuring the water content of said fluid as a function of the current delivered by said power source in the course of electrolysis of said absorbed water.

2. An apparatus for the determination of the water content of a fluid comprising in combination a closed conduit defining a fluid-retaining space, fluid inlet and outlet ports in said conduit, at least one pair of electrodes consisting of electrically conductive discs disposed transversely of said conduit between said fluid inlet and outlet ports, said discs being provided with aligned open longitudinal passages, a thin disc of electrical insulation disposed between each pair of said electrically conductive discs, said disc of electrical insulation being provided with open longitudinal passages aligned with the open longitudinal passages in said electrically conductive discs, a hygroscopic substance which is electrically conductive only when wet in contact with said electrically conductive discs through said open longitudinal passages, electrical leads connected with alternate ones of said electrically conductive discs, a direct current power source of voltage sufficient to electrolyze absorbed water in said hygroscopic substance connected across said leads, and current measuring means connected in circuit with said power source and said leads for measuring the water content of said fluid as a function of the current delivered by said power source in the course of electrolysis of said absorbed water.

3. An apparatus for the determination of the water content of a gas comprising in combination a closed conduit, gas inlet and outlet openings in said conduit, a first electrode disposed in said conduit between said gas inlet and outlet openings and out of contact with said conduit, a second electrode which is one of the group consisting of said conduit and an electrical conductor within said conduit, said second electrode being spaced in close proximity to said first electrode, a hygroscopic substance which is electrically conductive only when wet in contact with said first and second electrodes in amount sufficient to absorb substantially all of the water in gas passed through said conduit, a direct current power source of voltage sufficient to electrolyze absorbed water in said hygroscopic substance connected across said first and second electrodes, and current measuring means connected in circuit with said power source and said first and second electrodes for measuring the water content of said gas as a function of the current delivered by said power source in the course of electrolysis of said absorbed water.

4. An apparatus for the determination of the water content of a gas comprising in combination a closed conduit, gas inlet and outlet openings in said conduit, a pair of spaced elongated electrodes disposed in close proximity within said conduit out of contact therewith and between said gas inlet and outlet openings, a hygroscopic substance which is electrically conductive only when wet in contact with both said electrodes in amount sufficient to absorb substantially all of the water in gas passed through said conduit, a direct current power source of voltage sufficient to electrolyze absorbed water in said hygroscopic substance connected across said electrodes, and current measuring means connected in circuit with said power source and said electrodes for measuring the water content of said gas as a function of the current delivered by said power source in the course of electrolysis of said absorbed water.

5. An apparatus for the determination of the water content of a gas comprising in combination a closed conduit, gas inlet and outlet openings in said conduit, a plug of electrically insulating material disposed substantially coaxially within said conduit, said plug being provided with a helical thread abutting the inside wall of said conduit in gas-sealing relationship therewith, said gas inlet opening communicating with the space between successive crests of said helical thread in the region of one end of said plug, said gas outlet opening communicating with the space between successive crests of said helical thread in the region of the opposite end of said plug, a pair of elongated electrodes disposed in close proximity to one another between the lands of said helical thread, a hygroscopic substance which is electrically conductive only when wet in contact with both said electrodes in amount sufficient to absorb substantially all of the water in gas passed through the space between said conduit and said helical thread on said plug, a direct current power source of voltage sufficient to electrolyze absorbed water in said hygroscopic substance connected across said electrodes, and current measuring means connected in circuit with said power source and said electrodes for measuring the water content of said gas as a function of the current delivered by said power source in the course of electrolysis of said absorbed water.

References Cited in the file of this patent

UNITED STATES PATENTS

| | | |
|---|---|---|
| 1,995,492 | Andrus | Mar. 26, 1935 |
| 2,681,571 | Becker | June 22, 1954 |

FOREIGN PATENTS

| | | |
|---|---|---|
| 50,505 | France | June 11, 1940 |

OTHER REFERENCES

Handbook of Chemistry and Physics, 35th edition, Chem. Rubber Pub. Co., pp. 582 and 563.

U. S. DEPARTMENT OF COMMERCE
PATENT OFFICE

CERTIFICATE OF CORRECTION

Patent No. 2,830,945                                          April 15, 1958

Frederick A. Keidel

It is hereby certified that error appears in the printed specification of the above numbered patent requiring correction and that the said Letters Patent should read as corrected below.

Column 3, line 10, after the syllable "sis" insert --path--; lines 15 and 49, for "hydroscopic", each occurrence, read --hygroscopic--; column 4, line 23, for "resistance" read --resistances--; lines 44 and 45 for "example" read --sample--; column 5, line 10, for "rapidyy" read --rapidly--; line 35, for "absorbed" read --absorbent--.

Signed and sealed this 20th day of May 1958.

(SEAL)
Attest:
KARL H. AXLINE

Attesting Officer

ROBERT C. WATSON
Commissioner of Patents